May 2, 1939.　　　　　A. KUHNS　　　　　2,156,785
HYDRAULIC CLUTCH ASSEMBLY
Filed Feb. 26, 1938
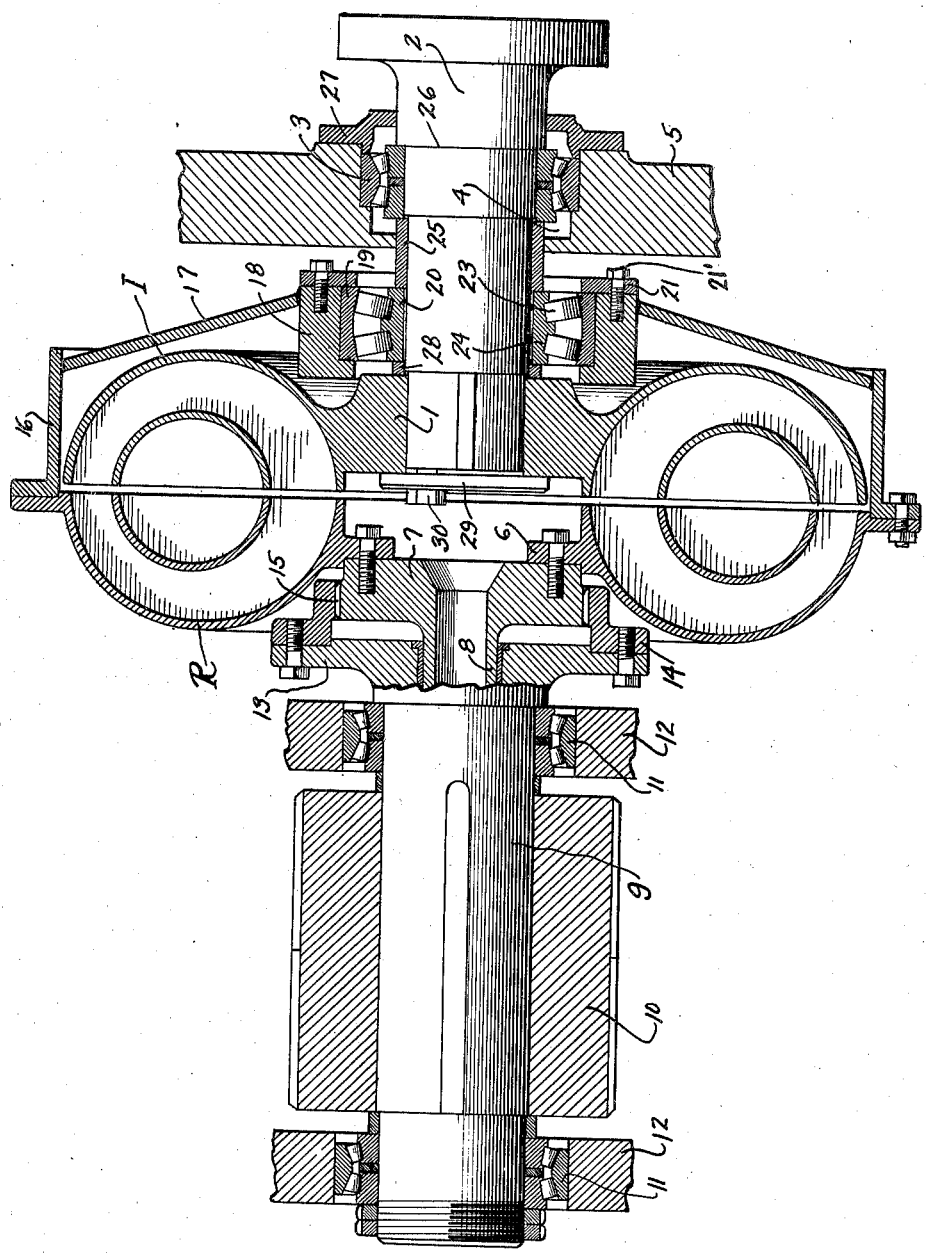
Inventor
AUSTIN KUHNS.
by Charles...
Attys.

Patented May 2, 1939

2,156,785

UNITED STATES PATENT OFFICE 2,156,785

HYDRAULIC CLUTCH ASSEMBLY

Austin Kuhns, Buffalo, N. Y., assignor to Farrel-Birmingham Company, Incorporated, Buffalo, N. Y., a corporation of Connecticut Application February 26, 1938, Serial No. 192,735

2 Claims. (Cl. 60—54)

My invention relates to hydraulic clutch or coupling assembly adapted particularly for coupling a driving source, such as a Diesel engine, with the gearing for transmitting the driving power to the propeller in marine craft, although the coupling assembly may be efficiently used in other power transmission systems.

My invention is particularly applicable in propulsion or driving assemblies such as disclosed in my copending application Serial No. 146,447, filed June 4, 1937, the important object of the invention being to provide improved and simplified means for absorbing the thrust created by the hydraulic clutch or coupling when in operation, a preferred arrangement being the provision of a self-aligning thrust bearing between the cover structure of the clutch runner element and the shaft carrying the impeller element, such arrangement eliminating the need for thrust bearings within the clutch casing itself.

My improved arrangement is incorporated in the structure shown on the drawing in which the figure shown is a longitudinal diametral cross-section of a driving assembly including a hydraulic clutch or coupling.

Referring to the drawing, the primary rotor or impeller element I is keyed by its hub 1 to the inner end of the drive shaft 2 which is adapted for connection with a suitable driving source, such as a Diesel engine, (not shown). The shaft is journaled by a suitable anti-friction bearing 3 located in the recess 4 of a supporting wall 5 extending from the supporting base or frame for the driving assembly.

The secondary rotor or runner element R is secured by its flange 6 to the head 7 at the inner end of the tubular shaft 8. Surrounding and journaled on the shaft 8 is the transmission shaft 9 carrying a drive pinion 10, the shaft 9 being journaled by suitable anti-friction bearings 11 supported in walls 12 on the supporting base or frame for the driving assembly. At its inner end the shaft 9 has a head 13 supporting an annular ring or flange 14 surrounding the head 7 on the runner shaft 8, the head 7 being connected in driving relation with the flange 14 by teeth or splines 15.

The transmission shaft 9 is driven by the runner shaft 8 through the spline connection 15, and the pinion 10 may mesh with a driving gear (not shown) for the propeller shaft of marine craft, as illustrated in my copending application referred to.

During operation of the clutch, the impeller and runner elements will be subjected by the hydraulic fluid pressure to outward axial thrust and for efficient operation this thrust should be resisted and absorbed so as to maintain proper and efficient axial relationship of the clutch elements and to prevent as much as possible the transmission of the thrust effort to the driving and driven shafts so that these shafts will not be shifted axially and their supporting bearings will not be subjected to lateral strains.

The means I have shown for taking up and absorbing the hydraulic thrust is in the form of a self-aligning thrust bearing structure between the runner element structure and the drive shaft 2. In the arrangement shown, the runner element carries a cover structure comprising a cylindrical wall 16 and the outwardly dished end wall 17 secured thereto and to a sleeve 18 surrounding and concentric with the drive shaft 2 adjacent to the hub 1 of the impeller element I. Seated in the sleeve 18 is the outer race or ring 19 of an anti-friction bearing whose inner race or ring 20 receives the drive shaft 2, the outer race being rigidly locked in the sleeve by the annular plate 21 detachably secured to the ring as by means of screws 21'. Between the race rings 19 and 20 are anti-friction members such as rollers 23. As shown, the inner face of the outer race 19 is transversely concave, the arc of curvature having its center in the center of the race and the rollers are inclined to be in planes radial to the curved race surface, the inner race being provided with guiding and aligning channels 24 for the rollers. The bearing structures will therefore permit free relative rotation of the impeller and runner structures and will function as a thrust bearing to resist axial thrusts of the elements. The inner race 20 of the bearing is held against axial movement relative to the drive shaft 2. As shown, a spacer collar or sleeve 25 surrounds the reduced section of the drive shaft on which the inner race 20 is located and is interposed between the inner race 20 and the inner race of the anti-friction bearing 3 which abuts the shoulder 26 of the drive shaft, the outer race of the bearing 3 being rigidly held in the recess 14 by the plate 27. Another spacer 28 is interposed between the inner race 20 and the hub 1 of the impeller member I. A plate 29 engages the inner side of the hub 1 and is secured by screws 30 threading into the inner end of the drive shaft 2 so that the drive shaft is adjusted axially in the hub 1 for clamping the inner races of the anti-friction bearing and the spacer members axially together between the shoulder 26 of the shaft 2 and the hub 1 of the impeller element. Sufficient clearance may be provided between the race ring 20 and the shaft so that the drive shaft 2 need not necessarily be in axial alignment with the runner shaft 8.

With the arrangement shown, the impeller and runner elements of the clutch are connected together through the bearing within the sleeve 18 and the bearing will automatically absorb the thrust created by the hydraulic clutch when in operation, and the arrangement eliminates the need for thrust bearings within the clutch casing itself. The thrust bearing is also self-aligning and will permit angular deviation of the impeller and runner shafts without disturbing the efficient operation of the clutch. The clutch structure will therefore always operate efficiently and the thrust bearing will prevent the transmission of any disturbing axial thrust to the shafts.

I have shown and described a practical embodiment of the features of my invention, but I do not desire to be limited to the exact construction, arrangement and operation shown and described as changes and modifications may be made without departing from the scope of the invention.

I claim as my invention:

1. In a power transmission assembly of the class described, a hydraulic clutch structure comprising opposed impeller and runner elements, a drive shaft secured to one of said elements, a bearing frame forming part of the other element and surrounding said shaft, and a self-aligning thrust bearing within said bearing frame comprising an outer race seated in said frame and an inner race surrounding said shaft and antifriction members between said races, said bearing functioning to absorb the thrust created by the hydraulic clutch when in operation and to permit relative angular shift of the axes of said elements, said inner race being of larger diameter than said shaft whereby to provide clearance so that the axes of said elements need not necessarily be in axial alinement.

2. In a power transmission assembly of the class described, a hydraulic clutch structure comprising opposed impeller and runner elements, a drive shaft secured to the impeller element, a bearing frame forming part of said runner element and surrounding said shaft adjacent to the outer side of said impeller element, and a self-aligning thrust bearing within said bearing frame comprising an outer race seated in said frame and an inner race surrounding said shaft, and antifriction members between said races, said bearing functioning to absorb the thrust created by the hydraulic clutch when in operation and to permit relative angular shift of the axes of said elements, said inner race being of larger diameter than said shaft whereby to provide clearance so that the axes of said elements need not necessarily be in axial alignment.

AUSTIN KUHNS.